United States Patent [19]
Ohsawa

[11] Patent Number: 5,628,602
[45] Date of Patent: May 13, 1997

[54] ANTI-THEFT HUB NUT FOR VEHICLE WHEELS

[75] Inventor: Tsuguyoshi Ohsawa, Sagamihara, Japan

[73] Assignee: KYO-EI Sangyo Kabushiki Kaisha, Osaka-fu, Japan

[21] Appl. No.: 588,415

[22] Filed: Jan. 18, 1996

[51] Int. Cl.$^6$ .............................. F16B 23/00; F16B 35/06
[52] U.S. Cl. ..................... 411/405; 411/410; 411/429; 411/910; 411/919
[58] Field of Search ........................ 411/402, 405, 411/407, 410, 910, 919, 429

[56] References Cited

U.S. PATENT DOCUMENTS

| | | | |
|---|---|---|---|
| 1,865,346 | 6/1932 | Wells | 411/405 X |
| 3,930,428 | 1/1976 | Hale | 411/402 X |
| 4,616,535 | 10/1986 | Chiavon | 411/405 X |
| 4,693,655 | 9/1987 | Omori | 411/910 X |
| 5,037,260 | 8/1991 | Rubin | 411/910 X |
| 5,324,149 | 6/1994 | Bainbridge | 411/405 X |

FOREIGN PATENT DOCUMENTS

| | | |
|---|---|---|
| 52-26334 | 3/1950 | Japan . |
| 49-126033 | 12/1974 | Japan . |
| 56-8917 | 1/1981 | Japan . |
| 57-9541 | 2/1982 | Japan . |
| 57-59701 | 4/1982 | Japan . |
| 57-77723 | 5/1982 | Japan . |
| 57-96003 | 6/1982 | Japan . |
| 57-157812 | 9/1982 | Japan . |
| 58-17210 | 2/1983 | Japan . |
| 58-119612 | 8/1983 | Japan . |
| 58-145202 | 9/1983 | Japan . |
| 58-139301 | 9/1983 | Japan . |
| 58-149619 | 10/1983 | Japan . |
| 58-161703 | 10/1983 | Japan . |
| 58-178001 | 11/1983 | Japan . |
| 58-196412 | 12/1983 | Japan . |
| 60-95303 | 6/1985 | Japan . |
| 60-164401 | 10/1985 | Japan . |
| 60-165202 | 11/1985 | Japan . |
| 61-23512 | 2/1986 | Japan . |
| 61-44016 | 3/1986 | Japan . |
| 61-21606 | 6/1986 | Japan . |
| 61-149606 | 7/1986 | Japan . |
| 62-19441 | 5/1987 | Japan . |
| 63-263102 | 10/1988 | Japan . |
| 1-71217 | 5/1989 | Japan . |
| 4-84912 | 7/1992 | Japan . |

*Primary Examiner*—Neill R. Wilson
*Attorney, Agent, or Firm*—Nikaido Marmelstein Murray & Oram LLP

[57] ABSTRACT

The present invention provides a device for protecting automobile wheels from being stolen, wherein the barrel portion of a hub nut to be tightened onto a hub bolt of an automobile wheel is shaped as a turning operative engaging surface in the form of a quasi-equilateral triangle whose each side consists of a convex surface. The engaging surface is cut at one, two or three sides thereof to form keyways extending parallel with the axis of rotation. Thus, unless an exclusive turning tool adapted to fit on the hub nut is used, the wheel cannot be removed.

4 Claims, 7 Drawing Sheets

ANTI-THEFT HUB NUT FOR VEHICLE WHEELS

BACKGROUND OF THE INVENTION

As for known techniques for protecting automobile wheels from being stolen by specially profiling hub nuts to be applied to hub bolts, there are Japanese Jikkai Sho 58-19612 and Sho 61-44016, which are thought to most closely resemble the present invention.

In said Japanese Jikkai Sho 58-119612, however, even if the outer peripheral surface 4 of a box nut body 1 is tapered, it is still round in shape and, moreover, engaging grooves 6 cut into the round outer peripheral surface 4 present a convex-concave pattern as a whole, wherein the concave grooves are diametrically opposed to each other, so that the box nut can be gripped as by commercially available pliers, thus being still in danger of being turned.

Further, said box nut body 1 has an engaging recessed portion 5 exposed on its front end and the inner peripheral surface of said engaging recessed portion 5 is also an angular type in which it recesses at diametrically opposite positions, so that it is in danger of being turned by a commonplace bifurcated fork being inserted therein.

Further, when said box nut body 1 is to be operated for turning by a genuine cap 2, as is obvious from FIG. 2, it has to be turned by engaging the engaging recessed portion 5 and the engaging grooves 6 of the box nut body 1 with the engaging convex portions 8 and 9 of the cap 2.

That is, since the outer peripheral surface of the box nut body 1 is circular, it is impossible to apply the surface pressure of the cap 2 (the torque produced by the wrench) to the whole of the box nut body 1 during the turning operation; the surface pressure locally acts only on said engaged surfaces.

As a result, it is difficult to correctly smoothly turn the box nut body 1 even by the use of the genuine cap 2, often resulting in deformation or chipping of said engaged portions, presenting a problem that such operation tending to lower the durability of the box nut body 1.

On the other hand, since the wheel nut 1 disclosed in Japanese Jikkai Sho 61-44016 has a polygonal engaging portion 3, 13, even if it is shaped as a tapered surface 3a, 13a, a commercially available wrench can be directly engaged with it, so that it is in danger of being turned without having to take the trouble of using the turning member 6.

Concerning this point, in the case of the embodiment shown in FIG. 3, although the polygonal engaging portion 13 is splined like a spline shaft, the grooves are diametrically opposed to each other, so that it has to be said that there is still the possibility of the wheel nut being turned as by commonplace pliers or wrench.

Further, in the case of the cut pattern of said polygonal engaging portion 3, 13, it would be difficult to prepare various forms of said steal preventing wheel nut 1 as so-called different-keyed configurations in abundance.

SUMMARY OF THE INVENTION

The present invention has been accomplished to solve such problem and has for its first object the provision of an arrangement wherein the barrel portion of a hub nut to be tightened onto a hub bolt of an automobile wheel is shaped as a turning operative engaging surface in the form of a quasi-equilateral triangle whose each side consists of a convex surface, reminding the viewer of the rotary form of a rotary engine, said engaging surface being cut at one, two or three sides thereof to form keyways cut into the convex surfaces and extending parallel with the axis of rotation, thereby making it impossible for a commercially available commonplace gripper, such as a wrench, pliers or bifurcated fork, to engage it, protecting automobile wheels from being stolen, and making it possible to produce various forms of said hub nuts as different-keyed configurations easily and in abundance depending on the number and arrangement of keyways.

That is, the hub nut can be turned only by the use of an exclusive wrench or adapter socket of special shape to fit to the aforesaid turning operative engaging surface in the form of a quasi-equilateral triangle, and a second object of the invention is to provide an arrangement wherein at that time, the surface pressure (torque) of the wrench is applied not only to the keyways of the hub nut but also to the apexes of said quasi-equilateral triangle, thereby preventing undesirable deformation or chipping of the opening edges of the keyways, so as to ensure that said hub nut is smoothly and correctly turned under a very high surface pressure, improving the operability and hub nut durability.

Other objects will become apparent together with the concrete arrangement of the invention from a detailed description to be later given of preferred embodiments.

DETAILED DESCRIPTION OF THE PREFERRED EMBODIMENTS

Figure 1:
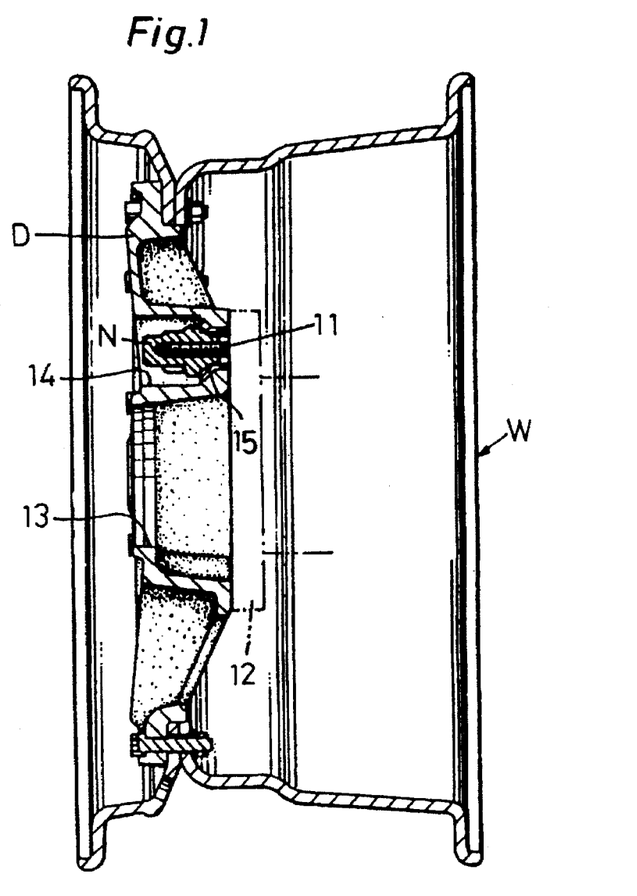
FIG. 1 is a side view, in section, showing a wheel-attached state with the present invention applied thereto.
Figure 2:
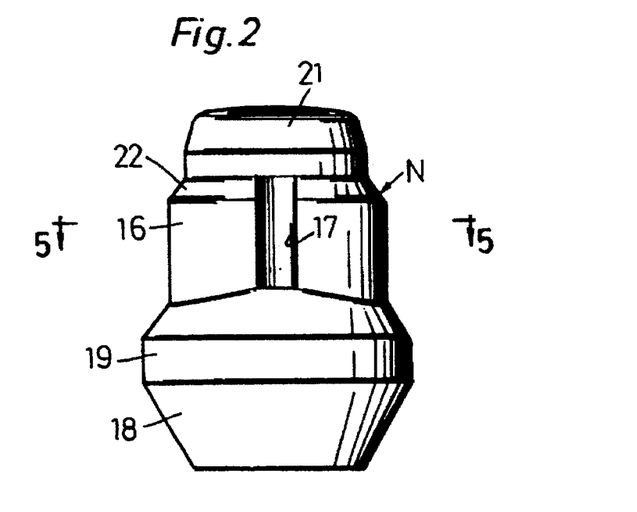
FIG. 2 is a front view of a hub nut extracted.
Figure 3:
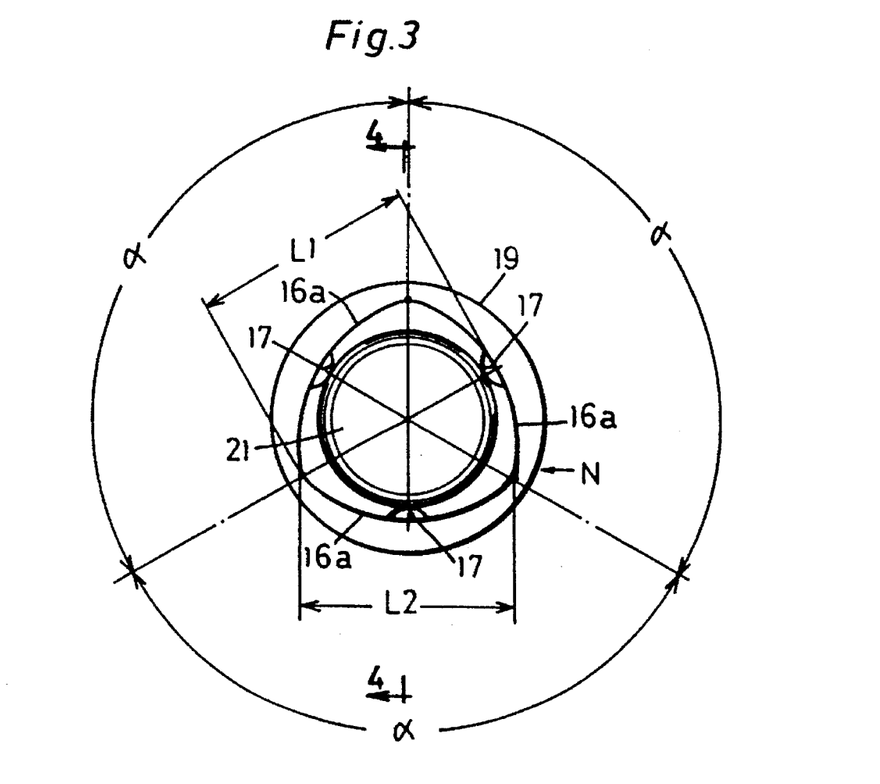
FIG. 3 is a plan view of FIG. 2.
Figure 4:
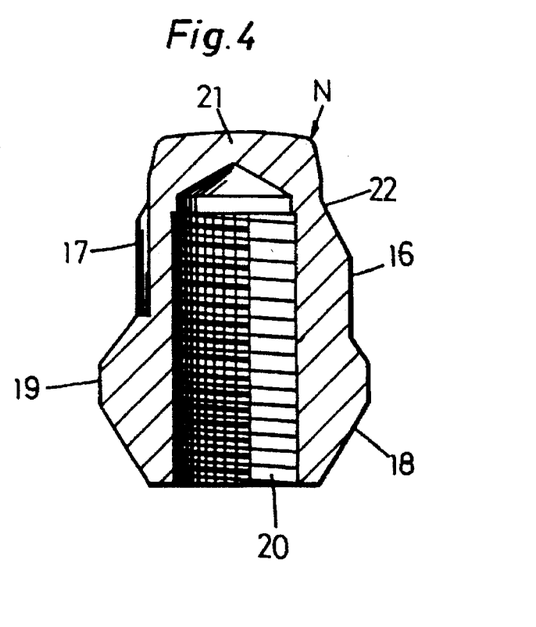
FIG. 4 is a sectional view taken along the line 4—4 in FIG. 3.
Figure 5:
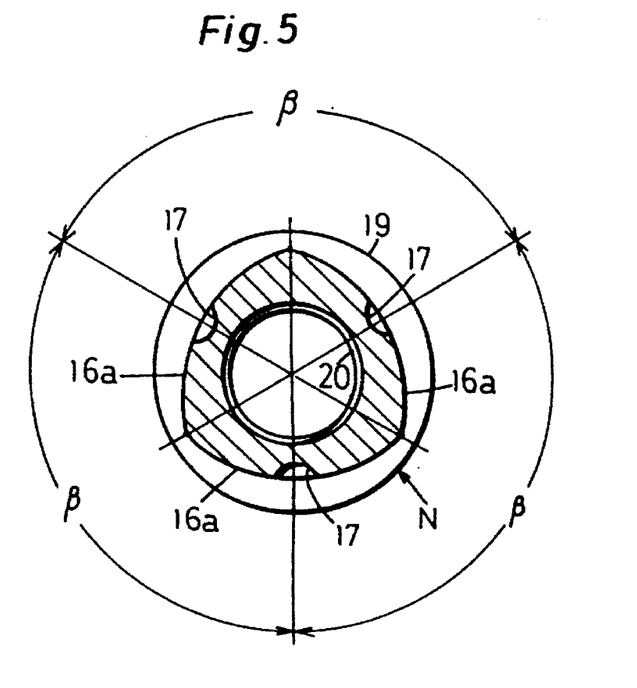
FIG. 5 is a sectional view taken along the line 5—5 in FIG. 2.
Figure 6:
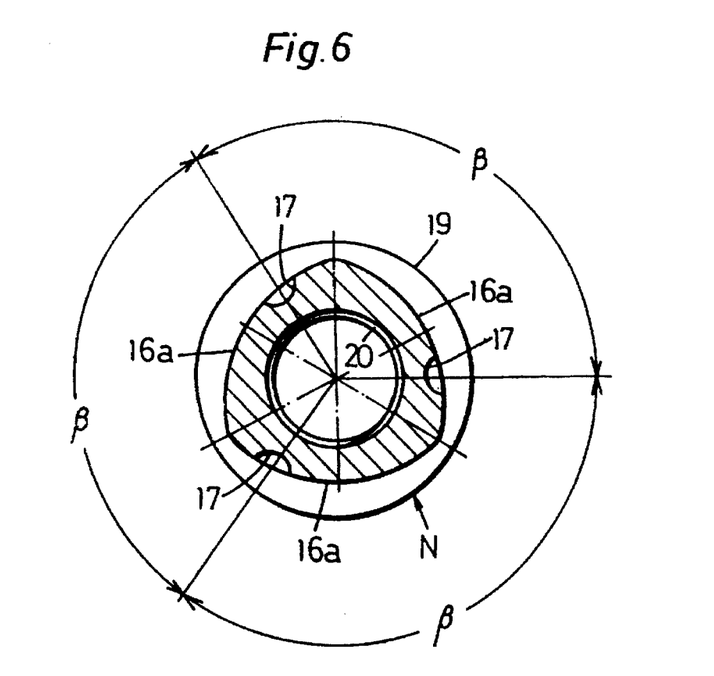
FIG. 6 is a sectional view showing a first modified embodiment of a hub nut corresponding to FIG. 5.
Figure 7:
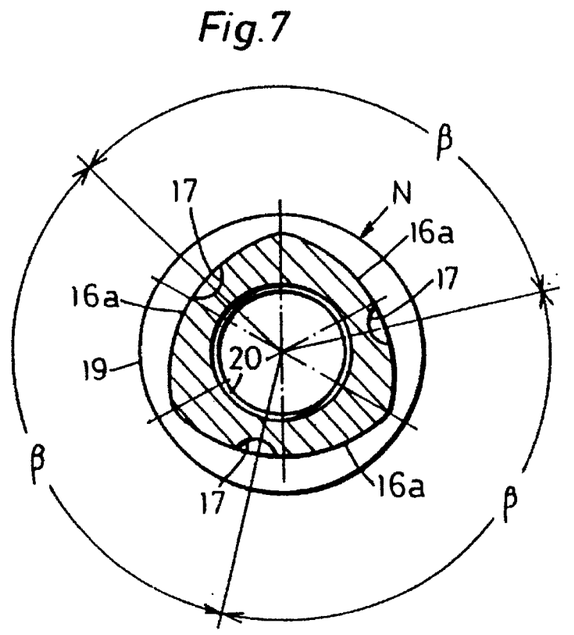
FIG. 7 is a sectional view showing a second modified embodiment of a hub nut.
Figure 8:
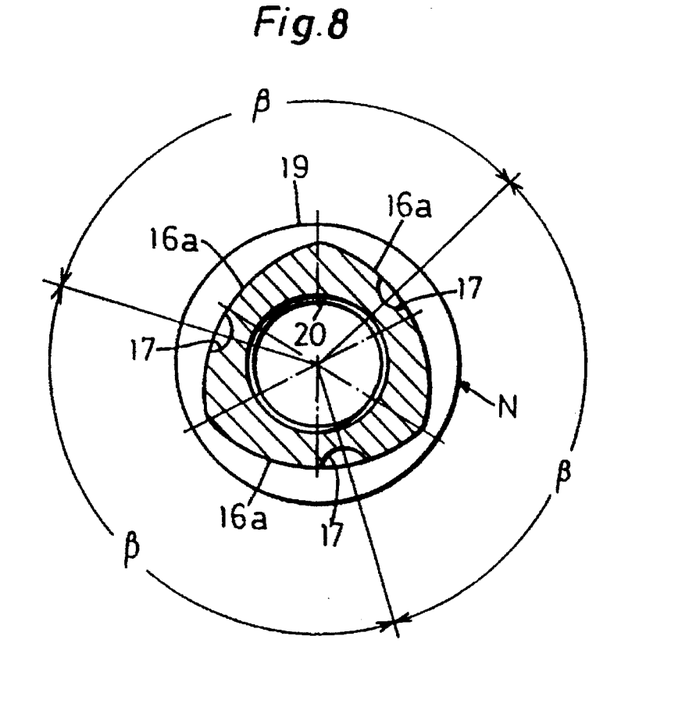
FIG. 8 is a sectional view showing a third modified embodiment of a hub nut.
Figure 9:
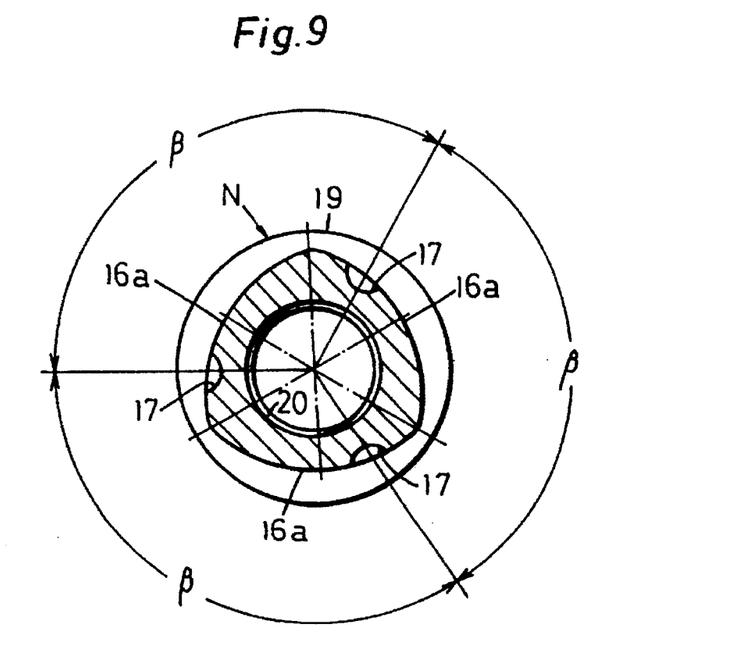
FIG. 9 is a sectional view showing a fourth modified embodiment of a hub nut.

The concrete arrangement of the invention will now be described with reference to the drawings. FIG. 1 shows the attached state of an automobile wheel W. The numeral 11 denotes a plurality of hub bolts (stud bolts) integrally erected on the hub 12 of an axle; D denotes a wheel disk having a plurality of disk attaching holes 14 formed around the periphery of its shaft bore 13 and distributed on a given PCD (Pitch Circle Diameter) for receiving said hub bolts 11.

The numeral 18 denotes a bushing force-fitted in each disk attaching hole 14, and N denotes a hub nut to be tightened onto a hub bolt 11 so as to fix the wheel disk D to the hub 12 of the axle. In the present invention, with the intention of protecting the wheel W from being stolen, the hub nut is made of steel in a special shape as shown in FIGS. 2–5, as by forging or other plastic processing.

More particularly, the outer peripheral surface of the barrel portion of the hub nut N is shaped as a turning operative engaging surface 1G in the form of a quasi-equilateral triangle whose each side forms a convex surface 16a, resembling the rotary form of a rotary engine. Each vertical angle is greater than 60 degrees, and the angle α between adjacent bisectors is about 120 degrees.

Furthermore, said convex surface on each side is formed as an arc with a given radius of curvature such that a line segment L1 bisecting each vertical angle and a line segment L2 interconnecting adjacent vertexes are equal in length.

The numeral 17 denotes keyways cut into the three sides of said turning operative engaging surface 16, in parallel with the axis of rotation of the hub nut N and in a concave form with a smaller radius of curvature than each convex surface 16a.

In this connection, in the basic embodiment in FIGS. 2 through 5, a total of three said keyways 17 are disposed on the bisectors of the quasi-equilateral triangle; however, as is suggested from first through fourth modified embodiments in FIGS. 6 through 9, they may be formed in successive positions slightly deviated from each bisector in a clockwise or counterclockwise direction.

In the basic embodiment in FIGS. 2 through 5 and in the modified embodiments in FIGS. 6 through 9, a total of three said keyways 17 are distributed at equal intervals of 120 degrees, with adjacent angles β equal to each other; however, they may be disposed such that the angles β have random values.

Figure 10:
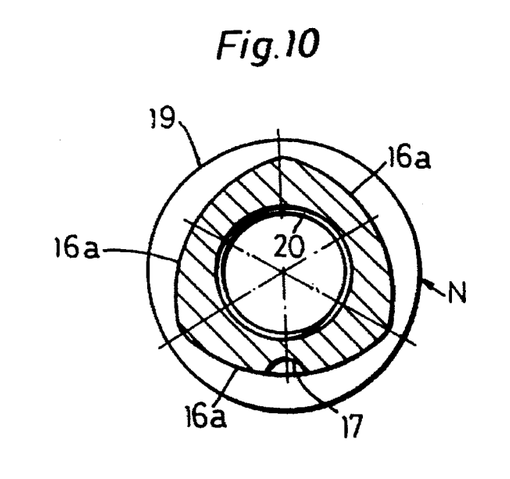
FIG. 10 is a sectional view showing a fifth modified embodiment of a hub nut.
Figure 11:
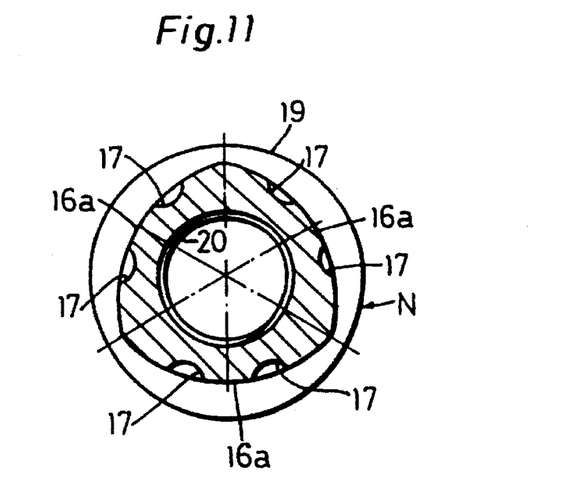
FIG. 11 is a sectional view showing a sixth modified embodiment of a hub nut.
Figure 12:
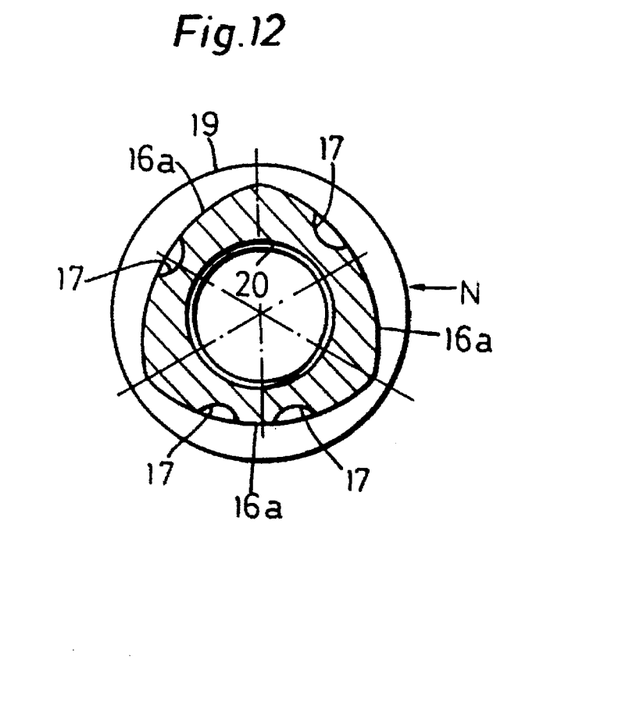
FIG. 12 is a sectional view showing a seventh modified embodiment of a hub nut.

Further, as is apparent from a fifth modified embodiment shown in FIG. 10, said turning operative engaging surface 16 may be cut at one side alone to form a keyway 17 or at two sides, or as shown in a sixth modified embodiment of FIG. 11, some keyways 17 may be cut into each side, or as suggested from a seventh modified embodiment of FIG. 12, it may be cut, as it were, in a mixed state, one side having one keyway, another having more. Thus, depending on the number and arrangement of such keyways 17, various hub nuts N may be prepared as different-keyed configurations in abundance.

The numeral 18 denotes an attaching seat surface shaped conical in he base end of aid hub nut N, serving to perform the function of alignment with said bushing 15. The numeral 19 denotes a receiving sop forming he boundary between the attaching seat surface 18 and the turning operative engaging surface 16, said stop having a circular form with a greater diameter than the imaginary circumscribed circle of the turning operative engaging surface 16, said stop receiving and restraining an adapter socket or wrench to be later described.

On the other hand, the front end of the hub nut N is formed as a covering decorative head 21 for a female thread 20, and is circular with a smaller diameter than that of the imaginary circumscribed circle of the turning operative engaging surface 16. And the boundary between the engaging surface 16 and the decorative surface 21 is smoothly continuous as a guiding conical shoulder surface 22 in which an adapter socket or wrench to be later described is inserted.

Figure 13:
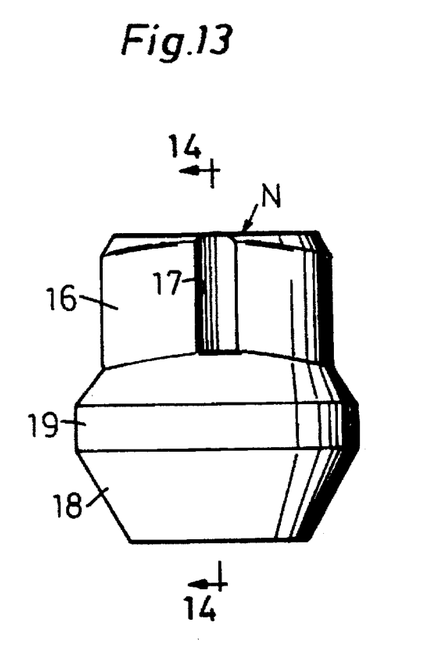
FIG. 13 is a sectional view showing an eighth embodiment of a hub nut corresponding to FIG. 2.
Figure 14:
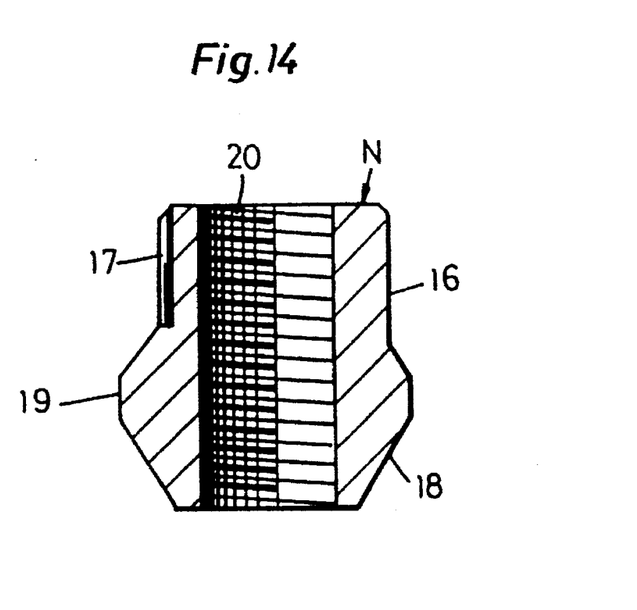
FIG. 14 is a sectional view taken along the line 14—14 in FIG. 13.

That is, the hub nut N is formed as a so-called box nut, and as shown in an eighth modified embodiment in FIGS. 13 and 14, provided that it has said quasi-equilateral triangular, turning operative engaging surface 16 and the keyways 17, the decorative head 21 may be omitted to expose the female thread 20 from the front end of the hub nut N.

Figure 15:
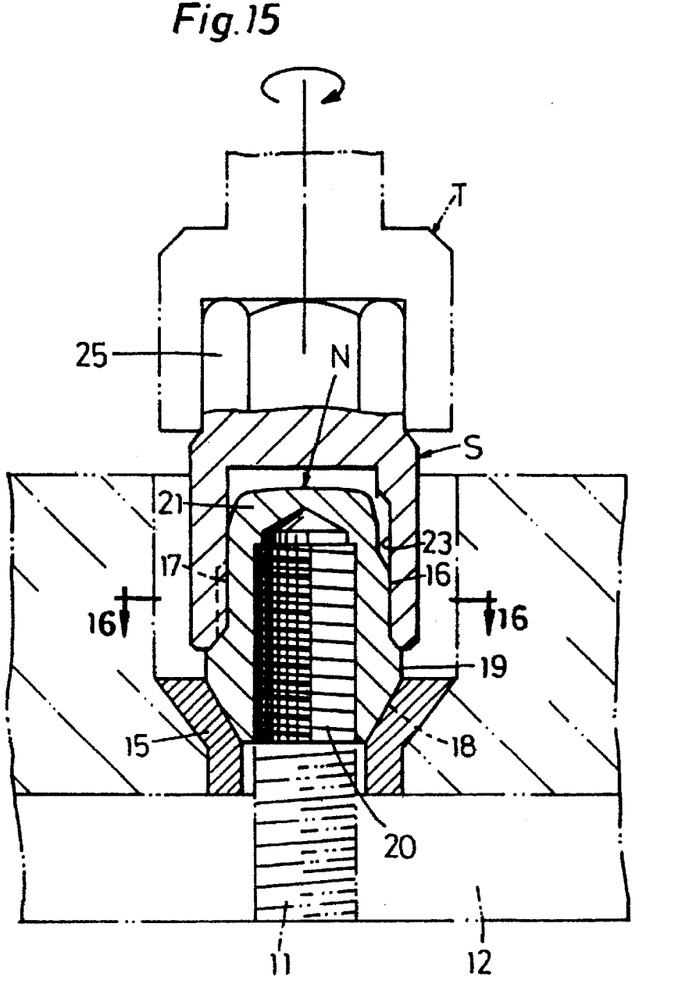
FIG. 15 s a side view, n section, showing the turning operative state of a hub nut.
Figure 16:
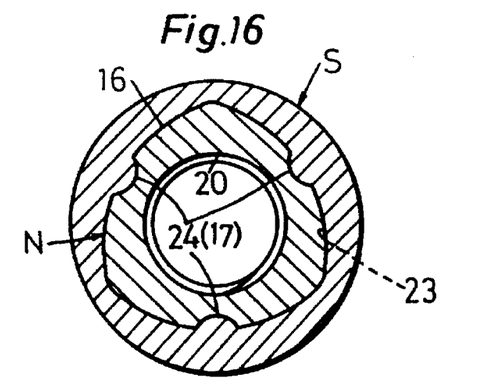
FIG. 16 s a sectional view taken along the line 16—16 in FIG. 15.

FIGS. 15 and 16 show the turning operative state of said hub nut N. And for this operation, it goes without saying that a special exclusive adapter socket S is prepared in advance which comprises a quasi-equilateral triangular fitting surface 23 adapted to fit on said engaging surface 16, and key convex portions 24 adapted to fit on said keyways 17. The numeral 25 denotes an engaging convex element formed at the front end of the adapter socket S and designed to receive a turning tool T such as a commercially available commonplace hexagon wrench.

And when it is desired to turn the hub nut N, this is effected by engaging the hub nut N with the hub bolt 11 erected from the hub 12 of the axle, as shown in FIGS. 15 and 16, cupping the adaptor socket S on the hub nut N, and engaging a turning operative tool T, such as a hexagon wrench, with the engaging convex portion 25 of the adaptor socket S. Thus, the tool T is turned to tighten the hub nut N onto the hub bolt 11 to fix it in position, whereupon the adaptor socket S as well as the tool T is extracted from the hub nut N.

This means that the torque from said tool T acts on the apexes of the quasi-equilateral triangle as the surface pressure of the adaptor socket S against not only the keyways 17 of the hub nut N but also the hub nut N, so that the whole of the hub nut N can be correctly turned, without the danger of undesirably deforming, much less chipping, the meshing regions in the keyways 17.

The turning operative engaging surface 16 of the hub nut N is in the form of a quasi-equilateral triangle and the keyways 17 are cut into the convex surfaces 16a; therefore, unless said special exclusive adaptor socket S adapted to fit correctly thereon is used, it is impossible to turn the hub nut N in the direction to loosen it. In this sense, this device protects the automobile wheel W from being stolen.

In addition, it goes without saying that the hub nut N can be directly turned by using a special exclusive wrench or other turning tool rather than using said adaptor socket S.

As has been described so far, in the present invention, the barrel portion of the hub nut N to be tightened onto the hub bolt 11 of the wheel W is formed as the turning operative engaging surface 16 the form of a quasi-equilateral triangle whose each side comprises he convex surface 16a, while said engaging surface 16 is cut at one, two or three sides thereof to form keyways 17 parallel with axis of rotation; thus, the technical problem described in the introduction has been solved.

That is, according to the above arrangement of the present invention, since the turning operative engaging surface 16 of the hub not N is constructed in the form of a quasi-equilateral triangle whose each side consists of a convex surface, which reminds the viewer of the rotary form of a rotary engine, it is impossible to operate the hub nut N for turning by a commercially available wrench or pliers.

Further, the turning operative engaging surface 16 forming a quasi-equilateral triangle is cut at one, two or three sides thereof to form keyways 17 cut into the convex surfaces 16a; therefore, even if they are cut into all of the three sides, there is no possibility of any two of the keyways being diametrically opposed to each other, and in this sense, it is impossible to engage a commonplace gripper, such as pliers or bifurcated fork, with it.

As a result, accidents of automobile wheel W being stolen can be avoided, and various forms of hub nuts N in different-keyed configurations can be prepared in abundance and with ease depending on the number and arrangement of said keyways 17.

A specially shaped exclusive wrench or adapter socket designed to fit on said quasi-equilateral triangular turning operative engaging surface 16 must be used before the hub nut N can be turned. In this case, the surface pressure (torque) of the wrench acts not only on the keyways 17 of the hub nut N but also on the apexes of said quasi-equilateral triangle, thus eliminating the danger of undesirably deforming, much less chipping, the opening edges of the keyways 17. Thus, the hub nut N can be smoothly and correctly turned under very high surface pressure; the invention is superior in operability and durability of the hub nut N.

Particularly, if the arrangement of claim 2 is employed, said effects can be further rigidly attained and an advantage that the required arrangement of the hub nut N; is simplified is obtained.

Further, if the arrangement of claim 3 is employed, the torque can be applied without loss along the axis of rotation of the hub nut N, so that it can be correctly and smoothly turned.

Further, if the arrangement of claim 4 is employed, it becomes more and more difficult for a commercially available commonplace gripping tool, such as pliers, to engage the keyways 17, and it becomes easier to vary the number or arrangement of the keyways in the sides of the engaging surface 16, making it possible to prepare various forms of hub nut N in abundance.

What is claimed is:

1. An anti-theft hub nut, comprising a barrel portion comprising a turning operative engaging surface having a quasi-equilateral triangular cross-sectional shape wherein each side of the quasi-equilateral triangle has a convex shape, wherein the turning operative engaging surface defines at least one keyway formed in at least one side of the quasi-equilateral triangle, the at least one keyway extending parallel with the axis of rotation of the hub nut.

2. The anti-theft hub nut of claim 1, wherein each side of the quasi-equilateral triangle has a convex shape with a given radius of curvature such that a first line segment interconnecting adjacent vertexes of the quasi-equilateral triangle and a second line segment bisecting the quasi-equilateral triangle are equal in length.

3. The anti-theft hub nut of claim 1, wherein a keyway is formed in each of the sides of the quasi-equilateral triangle such that the keyways are distributed with adjacent angles $\beta$ being equal.

4. The anti-theft hub nut of claim 1, wherein the at least one keyway has a concave shape with a smaller radius of curvature than a side of the quasi-equilateral triangle.

* * * * *